US009442010B2

(12) United States Patent
Yanagawa (10) Patent No.: US 9,442,010 B2
(45) Date of Patent: Sep. 13, 2016

(54) LIGHT MEASUREMENT APPARATUS (75) Inventor: Naoharu Yanagawa, Kawasaki (JP)

(73) Assignee: PIONEER CORPORATION, Kawasaki-Shi, Kanagawa (JP)

(*) Notice: Subject to any disclaimer, the term of this patent is extended or adjusted under 35 U.S.C. 154(b) by 0 days.

(21) Appl. No.: 14/407,626

(22) PCT Filed: Jun. 15, 2012

(86) PCT No.: PCT/JP2012/065357
§ 371 (c)(1),
(2), (4) Date: Dec. 12, 2014

(87) PCT Pub. No.: WO2013/186913
PCT Pub. Date: Dec. 19, 2013

(65) Prior Publication Data
US 2015/0124249 A1 May 7, 2015

(51) Int. Cl.
*G01J 3/443* (2006.01)
*G01J 3/02* (2006.01)
*G01J 1/08* (2006.01)
*G01J 1/04* (2006.01)

(52) U.S. Cl.
CPC ............... *G01J 3/0254* (2013.01); *G01J 1/08* (2013.01); *G01J 2001/0481* (2013.01)

(58) Field of Classification Search
CPC .......... G01B 9/00; G01J 1/08; G01J 3/0254; G01J 3/40; G01J 3/443
USPC ................................................ 356/124, 303
See application file for complete search history.

(56) References Cited

U.S. PATENT DOCUMENTS

| 5,182,618 A * | 1/1993 | Heinonen ............ G01N 21/474 250/228 |
| 5,384,641 A * | 1/1995 | Imura ................. G01N 21/474 250/228 |
| 6,407,767 B1 * | 6/2002 | Klees ..................... G03C 11/02 347/241 |
| 6,424,413 B1 * | 7/2002 | Weber .................. G01J 3/0251 250/228 |

(Continued)

FOREIGN PATENT DOCUMENTS

| JP | 64-073225 A | 3/1989 |
| JP | 05-312639 A | 11/1993 |

(Continued)

OTHER PUBLICATIONS

International Search Report and Written Opinion dated Sep. 13, 2012, issued for International Application No. PCT/ JP2012/ 065357.

*Primary Examiner* — Roy M Punnoose
(74) *Attorney, Agent, or Firm* — Procopio, Cory, Hargreaves & Savitch LLP (57) ABSTRACT

The light measurement apparatus according to the present invention includes: an integrating sphere; a reference calibration light source body holding unit that is arranged on the integrating sphere and to which a reference calibration light source body is attached; a test light source body holding unit that is arranged on the integrating sphere and to which a test light source body to be measured is attached; a light detection unit that is arranged on the integrating sphere and detects light from the reference calibration light source body and the test light source body; and a control unit that controls lighting of the reference calibration light source body and the test light source body, the light measurement apparatus being configured so that only either one of the reference calibration light source body and the test light source body is able to selectively emit light in the integrating sphere.

4 Claims, 9 Drawing Sheets

(56) References Cited

U.S. PATENT DOCUMENTS

2006/0203240 A1* 9/2006 Ingleson .......... G01J 3/02 356/319

2012/0197599 A1* 8/2012 Seibel, II .......... G01J 1/10 702/189

FOREIGN PATENT DOCUMENTS

| JP | 08-320253 A | 12/1996 |
|---|---|---|
| JP | 2003-214946 A | 7/2003 |
| JP | 2008-076126 A | 4/2008 |
| WO | 2010/140484 A | 12/2010 |

* cited by examiner

FIG.1

S1    = 0 OR ≥ 100?
S2    TURN ON STANDARD LIGHT SOURCE BODY
S3    RECEIVE CHARACTERISTIC SIGNAL FROM LIGHT DETECTOR TO GENERATE CALIBRATION VALUE, AND STORE CALIBRATION VALUE IN MEMORY
S4    TURN ON LIGHT SOURCE BODY TO BE MEASURED
S5    RECEIVE CHARACTERISTIC SIGNAL FROM LIGHT DETECTOR TO GENERATE CHARACTERISTIC MEASUREMENT VALUE
S6    CALCULATE CALIBRATION VALUE INTO CHARACTERISTIC MEASUREMENT VALUE TO DETERMINE CALIBRATED MEASUREMENT VALUE, AND STORE CALIBRATED MEASUREMENT VALUE IN MEMORY
S7    HAS LIGHT SOURCE BODY TO BE MEASURED BEEN REPLACED?
S8    INCREMENT COUNTER
S9    WAIT 10 SECONDS

S1 = 0 OR ≥ 100?
S2 EXTEND LIGHT SHIELDING PLATE 31a AND TURN ON STANDARD LIGHT SOURCE BODY
S3 RECEIVE CHARACTERISTIC SIGNAL FROM LIGHT DETECTOR TO GENERATE CALIBRATION VALUE, STORE CALIBRATION VALUE IN MEMORY, AND RETRACT LIGHT SHIELDING PLATE 31a
S4 EXTEND LIGHT SHIELDING PLATE 31b AND TURN ON LIGHT SOURCE BODY TO BE MEASURED
S5 RECEIVE CHARACTERISTIC SIGNAL FROM LIGHT DETECTOR TO GENERATE CHARACTERISTIC MEASUREMENT VALUE, AND RETRACT LIGHT SHIELDING PLATE 31b
S6 CALCULATE CALIBRATION VALUE INTO CHARACTERISTIC MEASUREMENT VALUE TO DETERMINE CALIBRATED MEASUREMENT VALUE, AND STORE CALIBRATED MEASUREMENT VALUE IN MEMORY
S7 HAS LIGHT SOURCE BODY TO BE MEASURED BEEN REPLACED?
S8 INCREMENT COUNTER
S9 WAIT 10 SECONDS

S1 = 0 OR ≥ 100?
S2 DRIVE MOVING STAGE TO MOVE STANDARD LIGHT SOURCE BODY TO LIGHTING POSITION, AND TURN ON STANDARD LIGHT SOURCE BODY
S3 RECEIVE CHARACTERISTIC SIGNAL FROM LIGHT DETECTOR TO GENERATE CALIBRATION VALUE, AND STORE CALIBRATION VALUE IN MEMORY
S4 DRIVE MOVING STAGE TO MOVE LIGHT SOURCE BODY TO BE MEASURED TO LIGHTENING POSITION, AND TURN ON LIGHT SOURCE BODY TO BE MEASURED
S5 RECEIVE CHARACTERISTIC SIGNAL FROM LIGHT DETECTOR TO GENERATE CHARACTERISTIC MEASUREMENT VALUE
S6 CALCULATE CALIBRATION VALUE INTO CHARACTERISTIC MEASUREMENT VALUE TO DETERMINE CALIBRATED MEASUREMENT VALUE, AND STORE CALIBRATED MEASUREMENT VALUE IN MEMORY
S7 HAS LIGHT SOURCE BODY TO BE MEASURED BEEN REPLACED?
S8 INCREMENT COUNTER
S9 WAIT 10 SECONDS

FIG.9

LIGHT MEASUREMENT APPARATUS

TECHNICAL FIELD

The present invention relates to a light measurement apparatus, and more particularly to a light measurement apparatus for measuring a characteristic of a light source body.

BACKGROUND ART

Standardization of light emitting devices such as LED devices and organic EL devices has been promoted in recent years. To measure the illuminance, spectrum, and other characteristics of such various light emitting devices and determine whether the characteristics conform to the standard, a light measurement apparatus using an integrating sphere configured, for example, so that its inner wall surface is covered with a material having a high light diffusion ratio is used.

Patent Literature 1 and Patent Literature 2 each disclose a light measurement apparatus using an integrating sphere, the light measurement apparatus being calibrated with a standard light source body before the standard light source body is replaced with a test light source body for the measurement of a luminous flux etc.

CITATION LIST

Patent Literature

Patent Literature 1: Japanese Patent Application Laid-Open No. Hei. 5-312639
Patent Literature 2: Japanese Patent Application Laid-Open No. Hei. 8-320253

SUMMARY OF INVENTION

Technical Problem

Light measurement apparatuses using an integrating sphere such as disclosed in Patent Literature 1 and Patent Literature 2 need the operation of loading the standard light source body for calibration into the integrating sphere and then unloading the standard light source body to replace it with a test light source body in each calibration process. Repetition of such loading and unloading can cause calibration errors due to stain, degradation, an attachment error, or the like of the standard light source body. For example, if a standard light source body of bulb type is used, the light emission of the standard light source body may vary in each calibration process due to the occurrence of stain on the light emitting surface of the bulb (in particular, fingerprints and the like in the case of manual replacement). If a standard light source body of optical fiber type is used, the characteristics of the light emission from the standard light source body may vary in each calibration process due to the occurrence of stain on the connection end surface of the optical fiber, an attachment failure of the optical fiber, and the like. Consequently, it has been difficult to stably calibrate the light measurement apparatuses with high accuracy.

The present invention has been achieved in view of the foregoing, and one of the objects thereof is to provide a light measurement apparatus that can stably perform accurate pre-measurement calibration and accurately measure a characteristic of a test light source body.

Solution to Problem

A light measurement apparatus according to the present invention comprises: an integrating sphere; a reference calibration light source body holding unit that is arranged on the integrating sphere and to which a reference calibration light source body is attached; a test light source body holding unit that is arranged on the integrating sphere and to which a test light source body to be measured is attached; a light detection unit that is arranged on the integrating sphere and detects light from the reference calibration light source body and the test light source body; and a control unit that controls lighting of the reference calibration light source body and the test light source body, the light measurement apparatus being configured so that only either one of the reference calibration light source body and the test light source body is able to selectively emit light in the integrating sphere.

Effect of Invention

According to the light measurement apparatus of the present invention, the operation for detaching and attaching the standard light source body for reference calibration is not needed at the time of measurement. Calibration can thus be performed with extremely high accuracy, and a characteristic of the test light source body of which the characteristic is actually measured can be measured with extremely high accuracy.

Figure 1:
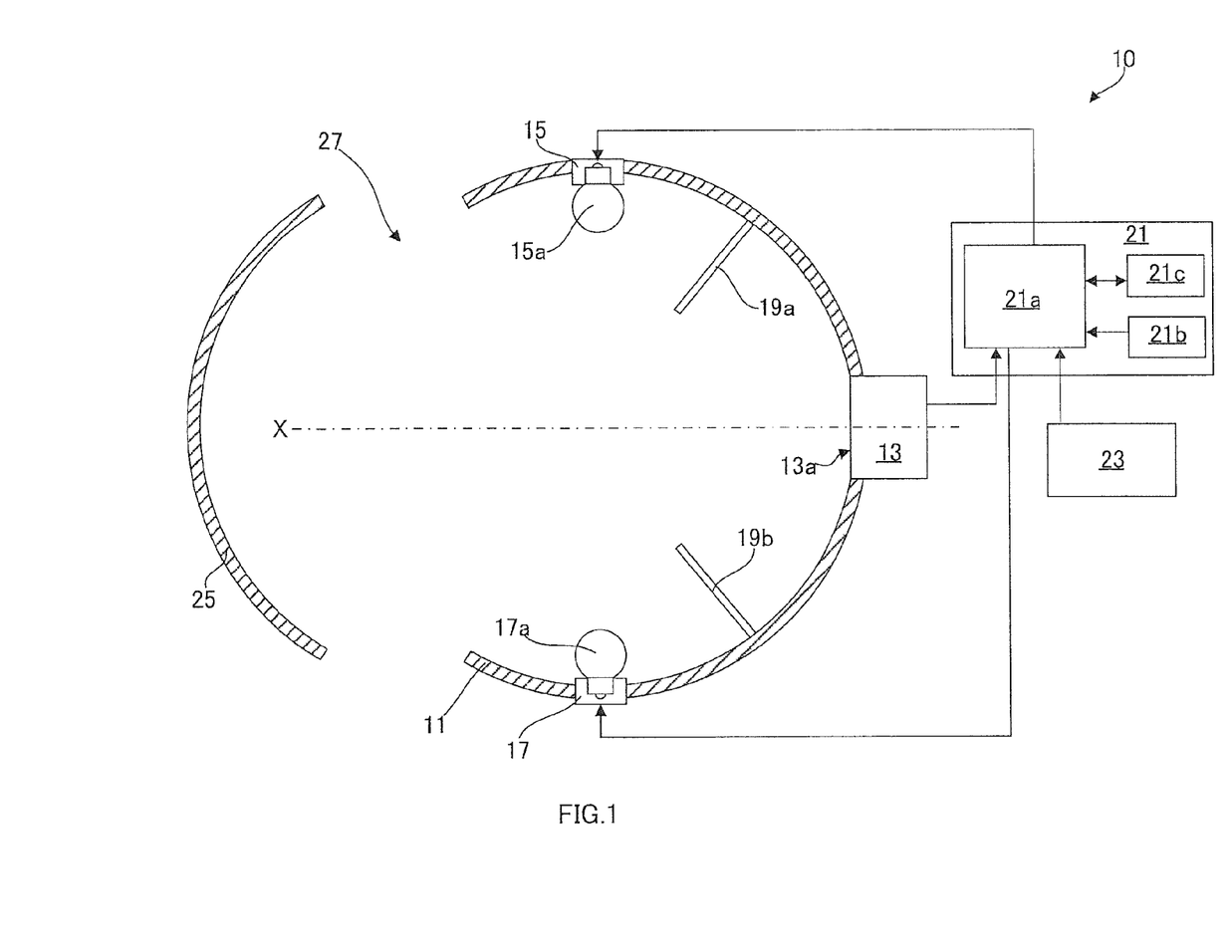
FIG. 1 is a cross-sectional view of a light measurement apparatus which is embodiment 1.

DESCRIPTION OF EMBODIMENTS (Embodiment 1)
A light measurement apparatus 10 which is embodiment 1 of the present invention will be described with reference to FIG. 1. An integrating sphere 11 is a hollow spherical body of which the inner wall surface is covered with a film having a high light diffusion ratio. A light detector 13 which detects light diffused by the inner wall surface of the integrating sphere 11 and outputs a characteristic signal indicating a characteristic (luminous flux, spectrum, etc.) of the light is arranged in an appropriate position in a wall of the integrating sphere 11. The light detector 13 has a light receiving surface 13a on a surface facing toward the interior of the integrating sphere 11. Although not shown in the diagram, the light detector 13 includes a spectroscope for analyzing an optical spectrum and the like, a ROM containing software for calculating various measurement results, and a CPU for executing the software. A system is configured so that various measurement results such as a spectral emission intensity spectrum, a spectral emission intensity, a total luminous flux, a correlated color temperature, chromaticity coordinates, a chromaticity diagram, and a calculation evaluation number can be obtained. The foregoing system may include a function of controlling a control unit 21 to be described below.

A standard light source body holding unit 15 to which a standard light source body 15a serving as a reference calibration light source body is attached and a test light source body holding unit 17 to which a test light source body 17a to be actually measured is attached are arranged in the inner wall of the integrating sphere 11. Examples of the standard light source body holding unit 15 and the test light source body holding unit 17 may include a socket for a light bulb to be attached to and a plug hole for an optical fiber device to be attached to. The standard light source body holding unit 15 and the test light source body holding unit 17 are arranged to be symmetrical with respect to a center line X of the integrating sphere which passes through the center of the light receiving surface 13a of the light detector 13, i.e., the light receiving sensitivity distribution of the light receiving surface 13a. Light emitted from the standard light source body 15a and the test light source body 17a can thus be detected by the light detector 13 under the same condition.

Light shielding plates (i.e., baffles) 19a and 19b are arranged between the light detector 13 and the standard light source body holding unit 15 and test light source body holding unit 17, respectively. The light shielding plates 19a and 19b are arranged to be symmetrical with respect to the center line X. The light shielding plates 19a and 19b play the role of shielding the light detector 13 so that the direct light from the light source bodies attached to the standard light source body holding unit 15 and the test light source body holding unit 17 is not incident on the light detector 13.

The control unit 21 is connected to the standard light source body holding unit 15 and the test light source body holding unit 17. The control unit 21 is further connected to the light detector 13 and receives the characteristic signal indicating the characteristic of light, output from the light detector 13. The characteristic is an arbitrary characteristic such as a total luminous flux and a spectrum distribution. The control unit 21 includes: a CPU 21a which controls light emission of the standard light source body 15a and the test light source body 17a, receives the characteristic signal from the light detector 13, and performs calculations; a ROM 21b in which a routine for automatically performing measurement is stored; and a RAM 21c which stores a calibration value, a calibrated measurement value, and the like. At the time of apparatus calibration, the CPU 21a supplies power to the standard light source body holding unit 15 to turn on the standard light source body 15a according to a manual input or automatically. At the time of measuring the characteristic of the test light source body 17a, the CPU 21a supplies power to the test light source body holding unit 17 to turn on the test light source body 17a.

The CPU 21a generates a calibration value on the basis of the signal output from the light detector 13 when the standard light source body 15 is turned on. The generated calibration value is stored in the RAM 21c, and calculated into a measurement value obtained by the signal output from the light detector when the test light source body 17a is turned on, whereby a calibrated measurement value indicating the accurate characteristic of the test light source body 17a is generated and stored in the RAM 21c.

Manual input means 23 is connected to the control unit 21. Examples of the manual input means 23 may include a keyboard and a touch panel. The supply of the power to the light source body holding units 15 and 17, the generation of the calibration value, and the generation of the calibrated measurement value and storage of the same into the RAM 21c may be performed according to input operations to the manual input means 23.

Note that only the measurement instruments such as the spectroscope may be arranged in the light detector 13. The software for calculating various measurement results may be stored in the ROM 21b of the control unit 21 so that the CPU 21a calculates the various measurement results on the basis of outputs from the measurement instruments in the light detector 13.

A lid body 25 is formed to be able to constitute part of the wall of the integrating sphere 11 in a position opposed to the position where the light detector 13 is arranged. During measurement, the lid body 25 is attached to the integrating sphere 11 to constitute part of the wall of the integrating sphere 11. When replacing the standard light source body 15a or the test light source body 17a, the lid body 25 is removed to provide a working hole portion 27 which allows access to the interior of the integrating sphere 11. Like the inner wall surface of the integrating sphere 11, the surface of the lid body 25 (integrating sphere inner surface side) that constitutes the inner wall surface of the integrating sphere 11 when the lid body 25 is attached to the integrating sphere 11 is also covered with a film having a high light diffusion ratio.

A method for measuring the characteristic of the test light source body 17a to be performed by using the light measurement apparatus 10 will be described below. Initially, a light source body attachment step of attaching the standard light source body 15a and the test light source body 17a to the standard light source body holding unit 15 and the test light source body holding unit 17, respectively, is performed.

Next, a calibration step of turning on the standard light source body 15a by the light source control unit and calibrating the apparatus is performed. Here, a calibration value is generated and stored in the RAM 21c on the basis of the characteristic signal generated by the light detector 13 detecting the light from the standard light source body 15a.

Next, a characteristic measurement step of turning off the standard light source body 15a and turning on the test light source body 17a by a the control unit and measuring the characteristic of the test light source body 17a is performed. Specifically, a characteristic measurement value is generated on the basis of the characteristic signal generated by the light detector 13 measuring the light from the test light source body 17a. The calibration value generated in the calibration step is calculated into the characteristic measurement value to determine a calibrated measurement value, which is stored into the RAM 21c.

Then, only the test light source body 17a is detached from the test light source body holding unit 17, and a test light source body 17a to be measured next is attached to the test light source body holding unit 17. Subsequently, the calibration step is performed in the same manner as described above if needed (for example, once for every 100 measurements of light source bodies to be measured, when a measurement value shows an anomaly, once a day or half day, or the like). The characteristic measurement step is then performed.

The supply of the power to the light source body holding units 15 and 17, and the generation and storage of the calibration value and the calibrated measurement value may be performed by giving commands to the control unit 21 via the manual input means 23 each time. Or alternatively, the CPU 21a may automatically perform all in a mutually cooperative manner.

Moreover, the standard light source body holding unit 15 and the test light source body holding unit 17 may be configured to be detachable from the integrating sphere 11 so that they can be detached to replace the standard light source body 15a or the test light source body 17a.

As described above, according to the light measurement apparatus 10, the standard light source body holding unit 15 and the test light source body holding unit 17 are arranged separately and symmetrically about the light detector 13. This eliminates the need to detach and attach the standard light source body 15a for calibration upon each characteristic measurement. Consequently, changes in the characteristic of the light emitted from the standard light source body 15a due to stain of the light emitting surface of the standard light source body, an attachment failure, or the like occurring from the detaching and attaching operation of the standard light source body 15a can be reduced to calibrate the light measurement apparatus with high accuracy.

Figure 2:
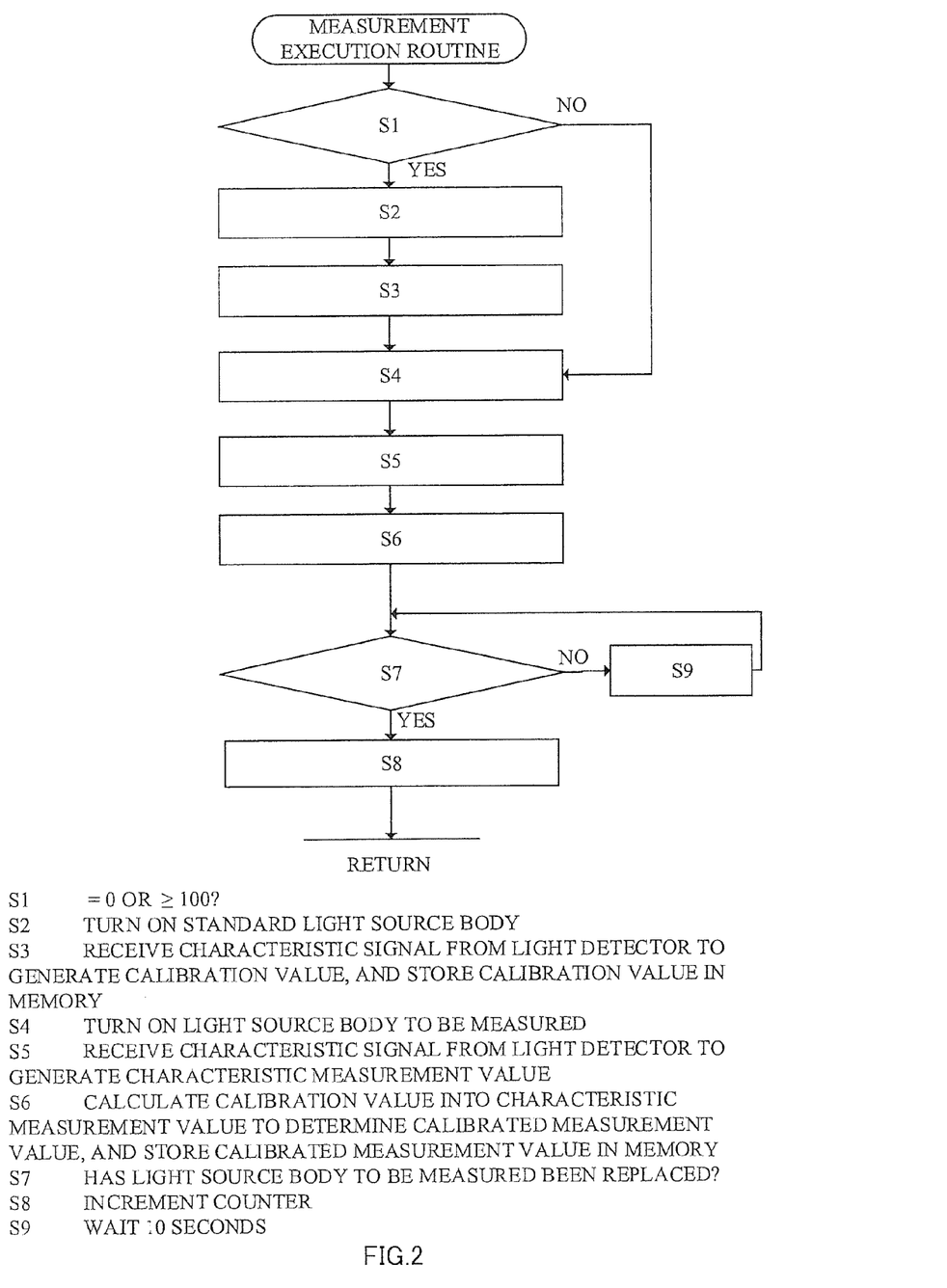
FIG. 2 is a flowchart showing an example of a measurement execution routine of the light measurement apparatus of FIG. 1.

If the procedure is automatically performed by the CPU 21a, the processing is performed, for example, by a measurement execution routine shown in FIG. 2, stored in the ROM 21b. In the present embodiment, an execution counter α for indicating the number of times of execution of the routine is used to determine the number of times of measurement.

Initially, in step S1, whether this is either the first measurement or the measurement after a certain number of repetitions (for example, 101st) since the previous acquisition of a calibration value is determined. If this is either the first measurement or the 101st measurement after the previous acquisition of a calibration value, the processing proceeds to step S2 and the standard light source body 15a is turned on.

If this is not the first measurement and the 100th or an earlier measurement after the previous acquisition of a calibration value, the operation proceeds to step S4 and the test light source body 17a is turned on.

After the end of step S2, the operation proceeds to step S3. The characteristic signal from the light detector 13 is received, a calibration value is generated, and the calibration value is stored (overwritten) in the RAM 21c.

After the end of step S3, the operation proceeds to step S4 and the test light source body 17a is turned on. After the end of step S4, the operation proceeds to step S5. The characteristic signal from the light detector 13 is received and a characteristic measurement value is generated.

After the end of step S5, the operation proceeds to step S6. The calibration value stored in the RAM 21c is calculated into the characteristic measurement value to determine a calibrated measurement value, and the calibrated measurement value is stored in the RAM 21c.

After the end of step S6, the operation proceeds to step S7 and whether the test light source body 17a has been replaced is determined. Whether the test light source body 17a has been replaced is determined, for example, by receiving a signal from a sensor (not shown) or the like included in the test light source body holding unit 17 or by an operator in charge of replacement pressing a replacement confirmation switch, etc. If the test light source body 17a is determined to have been replaced, the operation proceeds to step S8. The counter α is incremented and the measurement execution routine ends.

If the test light source body 17a is determined not to have been replaced yet, the operation proceeds to step S9. After a wait of a certain time (for example, 10 seconds), step S7 is performed again. If in the repeated step S7 the test light source body 17a is determined to have been replaced, the operation proceeds to step S8. The counter α is incremented and the measurement execution routine ends. Note that in step S9, a notification by a buzzer, a voice guidance, a lamp, an image display, and the like for prompting the operator to replace the test light source body may be issued.

(Embodiment 2)

Figure 3:
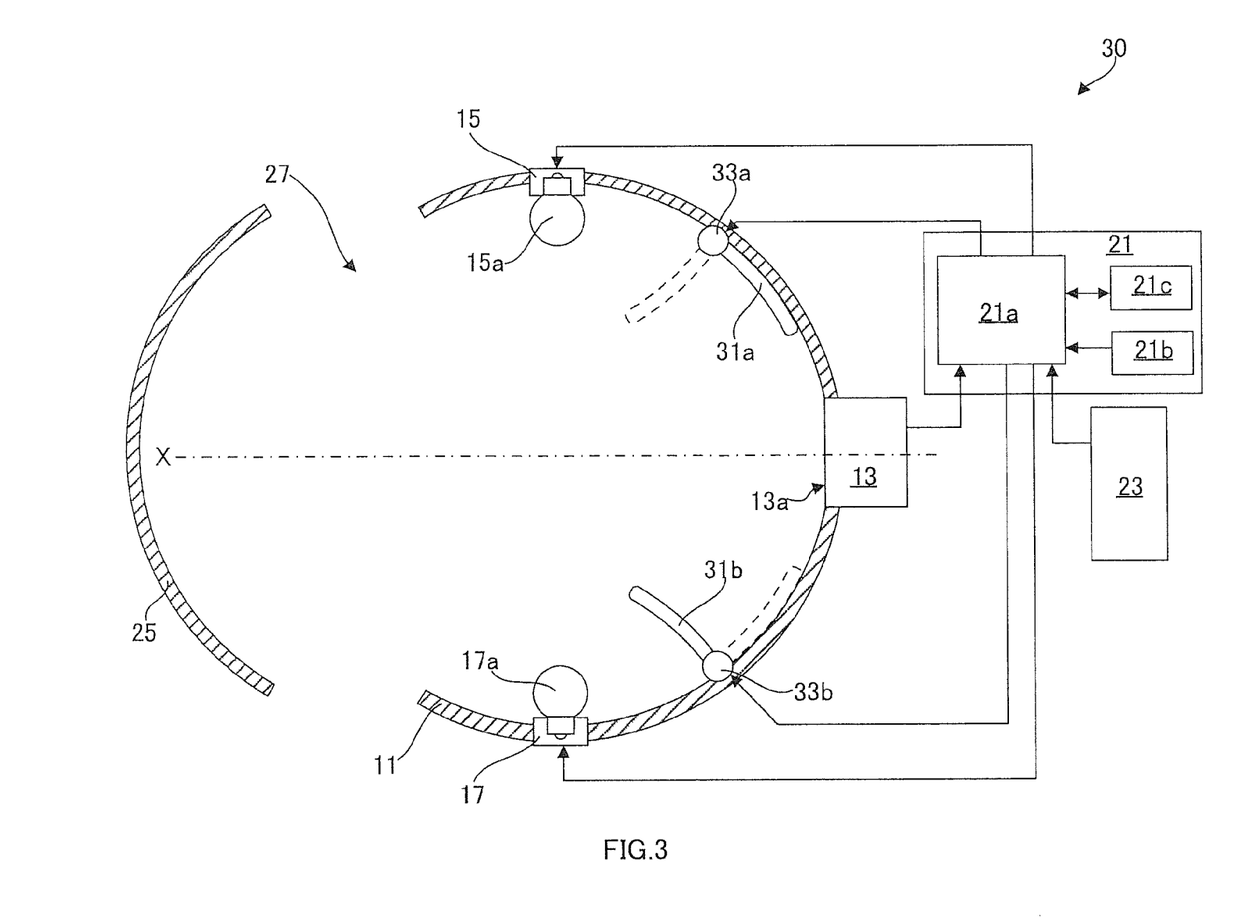
FIG. 3 is a cross-sectional view of a light measurement apparatus which is embodiment 2.

A light measurement apparatus 30 which is embodiment 2 of the present invention will be described below with reference to FIG. 3. The light measurement apparatus 30 has the same configuration as that of the light measurement apparatus 10 which is embodiment 1, except that the light shielding plates are movable. Note that FIG. 3 shows the light measurement apparatus 30 that is performing the calibration step with the test light source body 17a turned on.

In the light measurement apparatus 30, retractable light shielding plates 31a and 31b are arranged along the inner wall. The light shielding plates 31a and 31b are coupled to the inner wall of the integrating sphere 11 via hinge driving units 33a and 33b, respectively, which are arranged to be symmetrical with respect to the center line X of the integrating sphere passing through the light detector 13. The hinge driving units 33a and 33b include, for example, electric actuators for rotating the respective light shielding plates 31a and 31b (approximately 90°) about the hinge driving units 33a and 33b for extension or retraction. The hinge driving units 33a and 33b are connected to the control unit 21, and drive the light shielding plates 31a and 31b to extend or retract according to a drive signal from the control unit 21. When extended, the light shielding plates 31a and 31b lie between the light detector 13 and the standard light source body holding unit 15 and test light source body holding unit 17, respectively, to shield the light detector 13 so that the direct light from the light source bodies attached to the standard light source body holding unit 15 and the test light source body holding unit 17 is not incident thereon. As shown in FIG. 3, the light shielding plates 31a and 31b are preferably formed to have a curved surface having the same curvature as that of the inner wall surface of the integrating sphere 11, and when retracted, be arranged along the inner wall of the integrating sphere 11 to constitute part of the inner wall surface. A light diffusion material similar to that of the inner wall surface of the integrating sphere is preferably applied to the inside surfaces of the light shielding plates 31a and 31b which are exposed when the light shielding plates 31a and 31b are retracted. The extremities of the light shielding plates 31a and 31b are preferably rounded to avoid diffraction effects.

The light shielding plates 31a and 31b may be extended or retracted by giving a command to the control unit 21 via the manual input means 23 each time. The CPU 21a in the control unit 21 may automatically perform the entire procedure in a cooperative manner with the supply of the power to the light source body holding units 15 and 17 and the generation and storage of the calibration value and the calibrated measurement value.

When performing measurement by using the light measurement apparatus 30, in the calibration step, the light shielding plate 31a is extended and the light shielding plate 31b is retracted. In the characteristic measurement step, the light shielding plate 31b is extended and the light shielding plate 31a is retracted. In such a manner, according to the light measurement apparatus 30, an unnecessary light shielding plate can be retracted to eliminate errors due to the light shielding plate and improve the calibration accuracy and the characteristic measurement accuracy.

Figure 4:
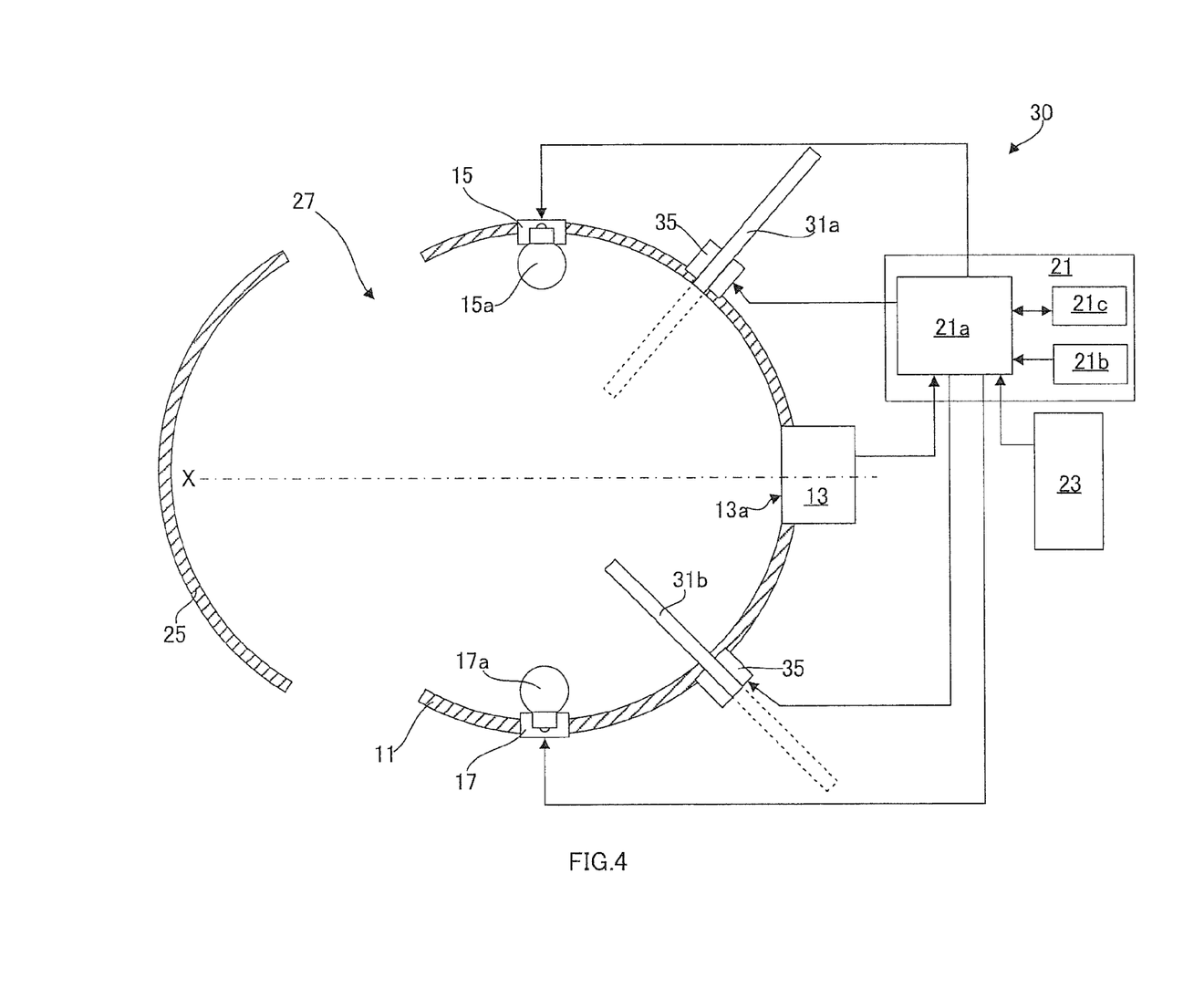
FIG. 4 is a cross-sectional view of a light measurement apparatus which is a modification.

As shown in FIG. 4, the light shielding plates 31a and 31b may be slid perpendicularly to the inner wall surface of the integrating sphere by driving units 35 and retracted to outside the integrating sphere. In such a case, changes of the inner wall surface of the integrating sphere 11 when the light shielding plates 31a and 31b are retracted can be further reduced to enable more accurate measurement. In such a case, the end faces of the light shielding plates 31a and 31b on the inner wall surface side are preferably covered with a film having the same high light diffusion ratio as that of the inner wall surface.

Figure 5:
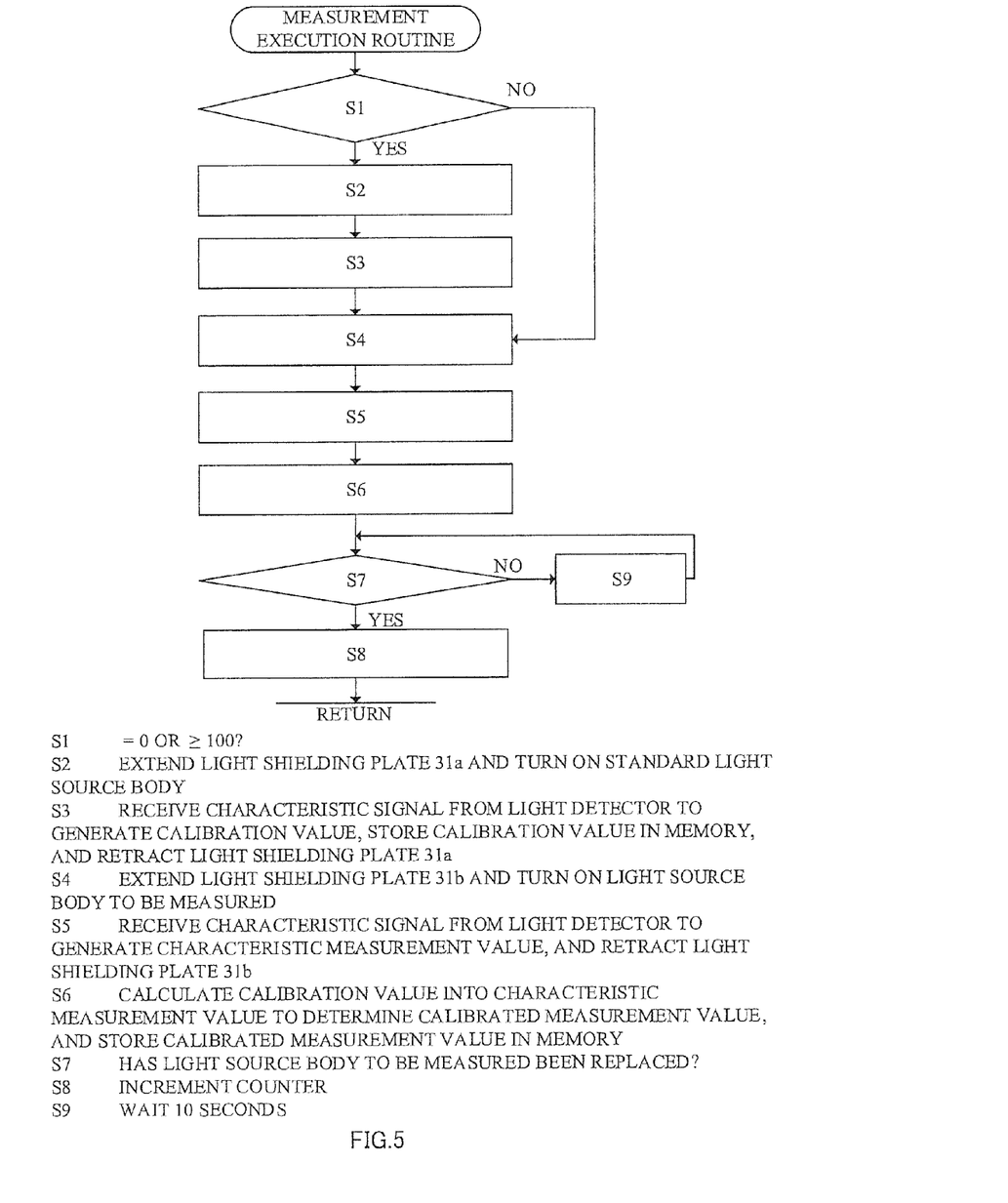
FIG. 5 is a flowchart showing an example of a measurement execution routine of the light measurement apparatuses of FIGS. 3 and 4.

If the CPU 21a automatically performs the procedure, the operation is performed, for example, by a measurement execution routine shown in FIG. 5, stored in the ROM 21b. In the present embodiment, an execution counter $\alpha$ for indicating the number of times of execution of the routine is used to determine the number of times of measurement.

Initially, in step S1, whether this is either the first measurement or the measurement after a certain number of repetitions (for example, 101st) since the previous acquisition of a calibration value is determined. If this is either the first measurement or the 101st measurement after the previous acquisition of a calibration value, the operation proceeds to step S2. The light shielding plate 31a is extended and the standard light source body 15a is turned on.

If this is not the first measurement and the 100th or an earlier measurement after the previous acquisition of a calibration value, the operation proceeds to step S4. The light shielding plate 31b is extended and the test light source body 17a is turned on.

After the end of step S2, the operation proceeds to step S3. The characteristic signal from the light detector 13 is received, a calibration value is generated, the calibration value is stored (overwritten) in the RAM 21c, and the light shielding plate 31a is retracted.

After the end of step S3, the operation proceeds to step S4. After the end of step S4, the operation proceeds to step S5. The characteristic signal from the light detector 13 is received, a characteristic measurement value is generated, and the light shielding plate 31b is retracted. The light shielding plate 31b may be retracted and extended each time the test light source body 17a is replaced. The light shielding plate 31b may be retracted only when the standard light source body 15a is turned on, and may be kept extended while a large number of light source bodies to be measured are continuously measured. Either one of the light shielding plates 31a and 31b may be retracted while the other is extended. When performing operations inside the integrating sphere 11 such as replacing a light source body, both the light shielding plates 31a and 31b may be retracted to facilitate the operations in the integrating sphere 11.

After the end of step S5, the operation proceeds to step S6. The calibration value stored in the RAM 21c is calculated into the characteristic measurement value to determine a calibrated measurement value, and the calibrated measurement value is stored in the RAM 21c.

After the end of step S6, the operation proceeds to S7 and whether the test light source body 17a has been replaced is determined. Whether the test light source body 17a has been replaced is determined, for example, by receiving a signal from a sensor (not shown) or the like included in the test light source body holding unit 17 or by an operator in charge of replacement pressing a replacement confirmation switch, etc. If the test light source body 17a is determined to have been replaced, the operation proceeds to step S8. The counter $\alpha$ is incremented and the measurement execution routine ends.

If the test light source body 17a is determined not to have been replaced yet, the operation proceeds to step S9. After a wait of a certain time (for example, 10 seconds), step S7 is performed again. If in the repeated step S7 the test light source body 17a is determined to have been replaced, the operation proceeds to step S8. The counter $\alpha$ is incremented and the measurement execution routine ends. Note that in step S9, a notification by a buzzer, a voice guidance, a lamp, an image display, and the like for prompting the operator to replace the test light source body may be issued.

(Embodiment 3)

Figure 6:
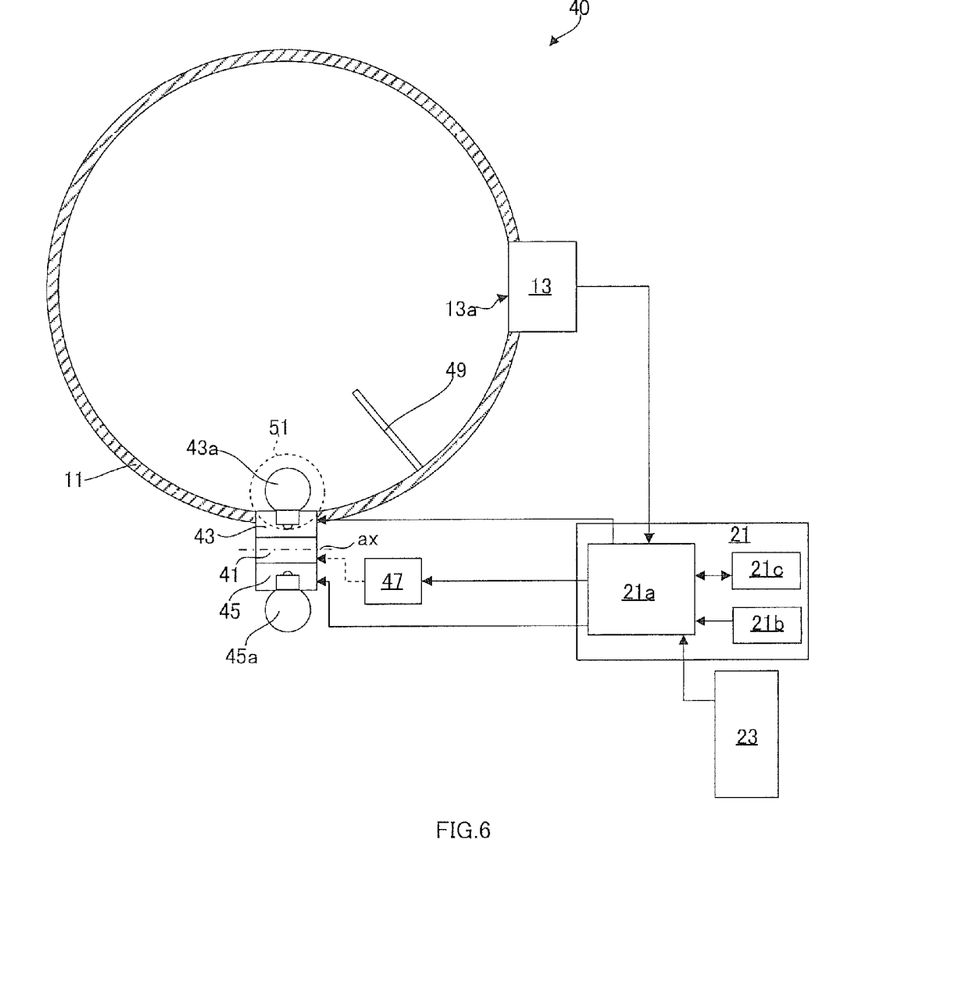
FIG. 6 is a cross-sectional view of a light measurement apparatus which is embodiment 3.

A light measurement apparatus 40 which is embodiment 3 of the present invention will be described below with reference to FIG. 6. The light measurement apparatus 40 according to embodiment 3 includes an integrating sphere 11, a light detector 13, a control unit 21, and manual input means 23 similar to those of the light measurement apparatus 10 according to embodiment 1.

In the light measurement apparatus 40, a moving stage (rotating moving stage) 41 is arranged in part of a peripheral wall of the integrating sphere 11. The moving stage 41 has a standard light source body holding unit 43 on one side and a test light source body holding unit 45 on the other, opposite side. The moving stage 41 is connected to, for example, an electric driving unit 47 via a gear, a chain, a drive shaft, or the like (not shown), and configured to be rotatable and movable by the operation of the driving unit 47. The driving unit 47 is connected to the control unit 21. According to a control signal from the control unit 21, the driving unit 47 drives the moving stage 41, for example, to rotate about a rotation axis ax which passes through the moving stage 41 and is parallel to the plane of the drawing, and determines the angular position of the moving stage about the rotation axis ax. For example, according to an input in the manual input means 23 or automatically, the driving unit 47 is made to drive the moving stage 41 to rotate so that in a calibration step, a standard light source body 43a is arranged in a lighting position 51 inside the integrating sphere, and in a characteristic measurement step, a test light source body 45a is arranged in the lighting position 51 inside the integrating sphere. In other words, the driving unit 47 constitutes a positioning mechanism for moving the moving stage 41 to position either one of the standard light source body 43a and the test light source body 45a to the lighting position 51. Like the foregoing embodiments, the lighting of the standard light source body 43a and the test light source body 45a is controlled by the control unit 21. The standard light source body 43a and the test light source body 45a are turned on when in the lighting position 51. Note that the light measurement apparatus 40 includes only one light shielding plate 49 between the light detector 13 and the lighting position 51.

According to the light measurement apparatus 40, the position of the standard light source body 43a in the calibration step is the same as the position of the test light source body 45a in the characteristic measurement step. This can eliminate measurement errors due to a difference in position between the standard light source body 43a and the test light source body 45a. Since a plurality of light shielding plates do not need to be formed inside the integrating sphere, measurement can be performed with higher accuracy. Since the light source body holding units 43 and 45 are exposed to outside the integrating sphere 11 by the rotation of the moving stage 41, the light source bodies can be easily replaced.

Figure 7:
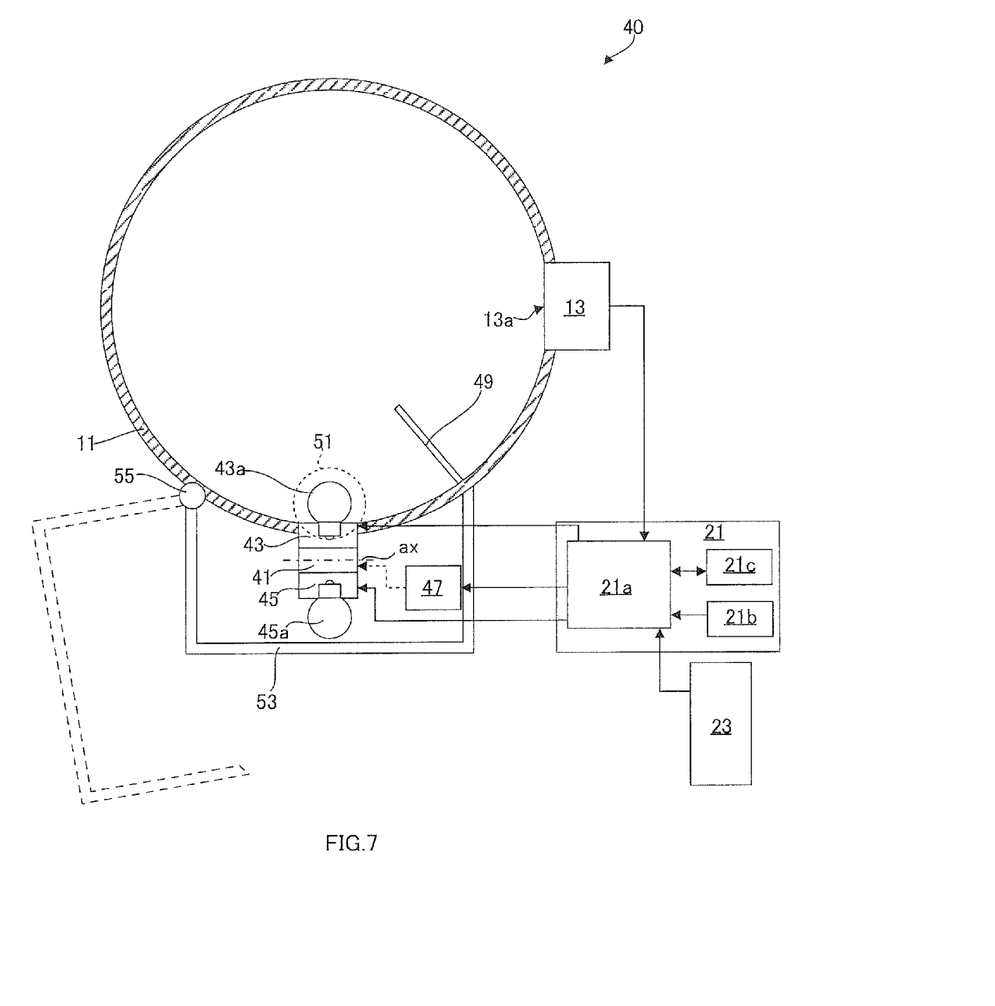
FIG. 7 is a cross-sectional view of a light measurement apparatus which is a modification.

As shown in FIG. 7, to prevent stain of the light source bodies situated outside the integrating sphere 11 when not emitting light, a removable cover 53 may be arranged to cover the moving stage 41 from outside the integrating sphere 11. This can reduce measurement errors due to stain of the light source bodies.

When continuously measuring a large number of light source bodies to be measured 45a, i.e., when measuring test light source bodies as a mass-producing operation, the removable cover 53 is preferably automatically closed to protect the precious standard light source body 43a from dust and the like. When the moving stage 41 is rotated to expose the to-be measured light source body holding unit 45 to outside the integrating sphere 11 and replace the test light source body, the removable cover 53 is preferably automatically opened. Such an operation may be performed, for example, by a hinge driving unit 55 which connects the integrating sphere 11 and the cover 53.

Figure 8:
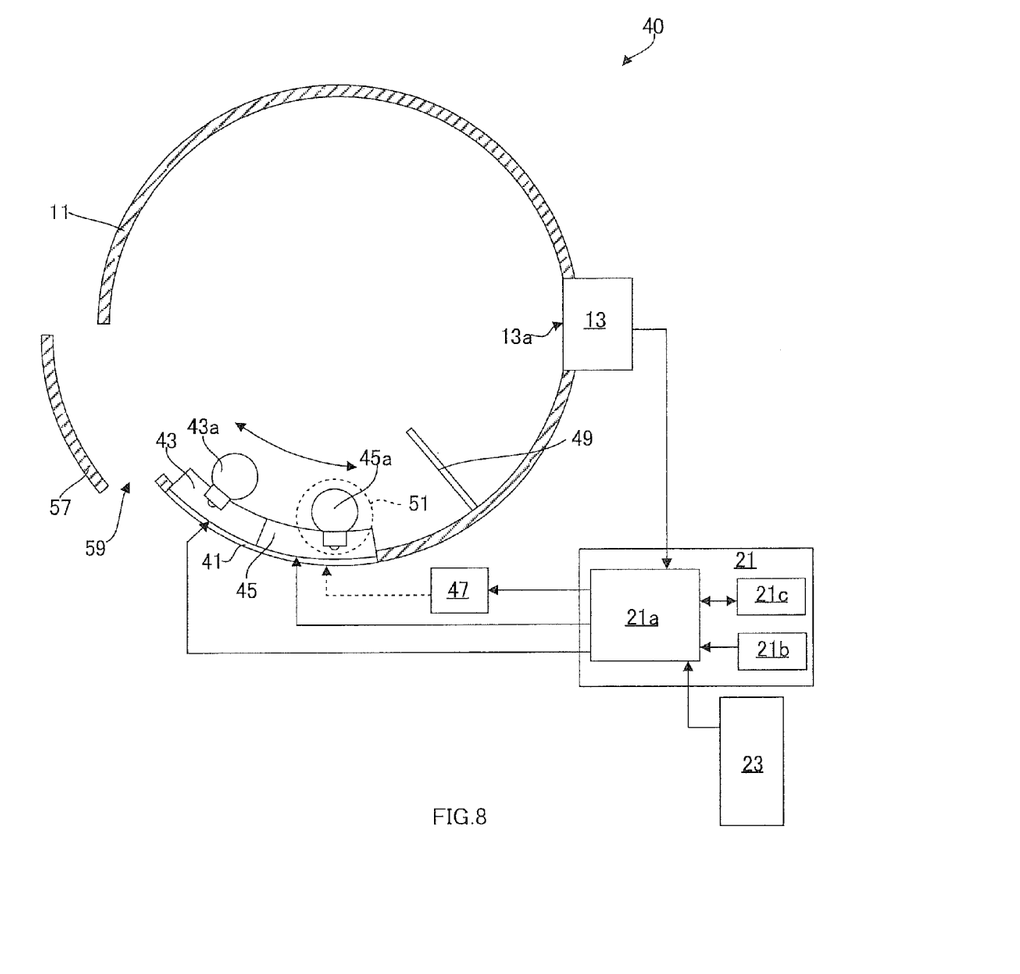
FIG. 8 is a cross-sectional view of a light measurement apparatus which is a modification.

As shown in FIG. 8, the moving stage 41 may be formed to be slidable along the inner wall of the integrating sphere 11. In such a case, the moving stage 41 is configured to be slidable in a circumferential direction (the direction of the arrow in the diagram) by the driving unit 47, for example, along a rail (not shown) formed on the inner wall of the integrating sphere. The driving unit 47 is controlled by the control unit 21. The driving unit 47 is made to drive the moving stage 41 to slide so that in a calibration step, the standard light source body 43a is arranged in the lighting position 51 inside the integrating sphere, and in a characteristic measurement step, the test light source body holding unit 45 is arranged in the lighting position 51 inside the integrating sphere. Here, the moving stage 41 can be removed in an arbitrary form for the sake of replacement of the light source bodies. For example, a lid body 57 that can constitute part of the wall of the integrating sphere 11 may be removed, the moving stage 41 may be slid to a working hole 59, and the moving stage 41 may be taken out of the working hole 59.

Figure 9:
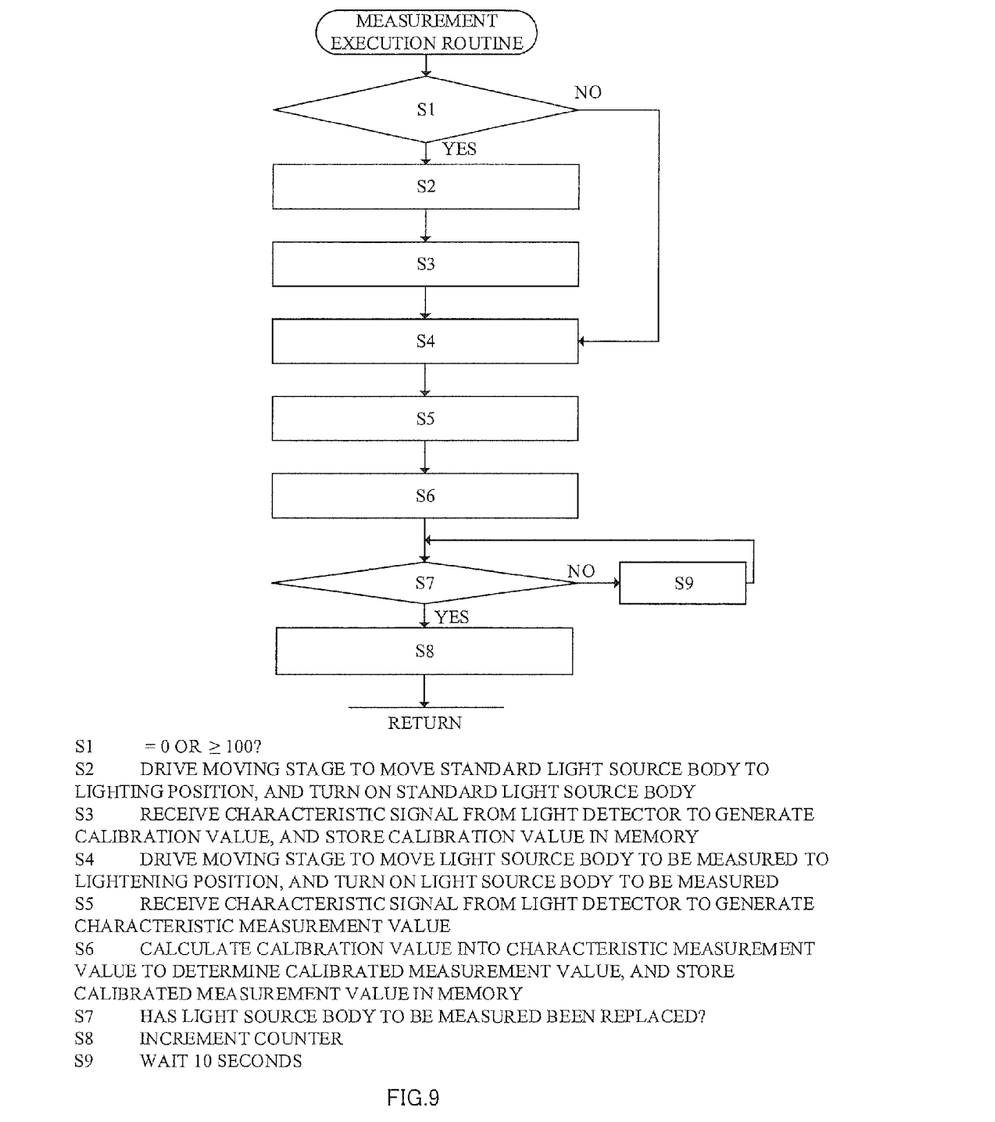
FIG. 9 is a flowchart showing an example of a measurement execution routine of the light measurement apparatuses of FIGS. 6, 7, and 8.

In the light measurement apparatus 40, if the CPU 21a automatically executes the procedure, the operation is performed, for example, by a measurement execution routine such as shown in FIG. 9. In the present embodiment, an execution counter α indicating the number of times of execution of the routine is used to determine the number of times of measurement.

Initially, in step S1, whether this is either the first measurement or the measurement after a certain number of repetitions (for example, 101st) since the previous acquisition of a calibration value is determined. If this is the first measurement or the 101st measurement after the previous acquisition of a calibration value, the operation proceeds to step S2. The standard light source body 43a is moved to the lighting position and the standard light source body 43a is turned on.

If this is not the first measurement and the 100th or an earlier measurement after the previous acquisition of a calibration value, the operation proceeds to step S4. The test light source body 45a is moved to the lighting position and the test light source body 45a is turned on.

After the end of step S2, the operation proceeds to step S3. The characteristic signal from the light detector 13 is received, a calibration value is generated, and the calibration value is stored (overwritten) in the RAM 21c.

After the end of step S3, the operation proceeds to step S4. The test light source body 45a is moved to the lighting position and the test light source body 45a is turned on. After the end of step S4, the operation proceeds to step S5. The characteristic signal from the light detector 13 is received and a characteristic measurement value is generated.

After the end of step S5, the operation proceeds to step S6. The calibration value stored in the RAM 21c is calculated into the characteristic measurement value to determine a calibrated measurement value, and the calibrated measurement value is stored in the RAM 21c.

After the end of step S6, the operation proceeds to step S7 and whether the test light source body 45a has been replaced is determined. Whether the test light source body 45a has been replaced is determined, for example, by receiving a signal from a sensor (not shown) or the like included in the test light source body holding unit 45 or by an operator in charge of replacement pressing a replacement confirmation switch, etc. If the test light source body 45a is determined to have been replaced, the operation proceeds to step S8. The counter α is incremented and the measurement execution routine ends.

If the test light source body 45a is determined not to have been replaced yet, the operation proceeds to step S9. After a wait of a certain time (for example, 10 seconds), step S7 is performed again. If in the repeated step S7 the test light source body 45a is determined to have been replaced, the operation proceeds to step S8. The counter α is incremented and the measurement execution routine ends.

Note that in step S7, the cover 53 may be automatically opened. If the test light source body 45a is determined to have been replaced, the cover 53 may be automatically closed. In step S9, a notification by a buzzer, a voice guidance, a lamp, an image display, and the like for prompting the operator to replace the test light source body may be issued.

Various numerical values, dimensions, materials, routines, and the like in the foregoing embodiments are mere illustrative, and may be selected as appropriate according to intended uses and the like.

REFERENCE SIGNS LIST 10, 30, 40 light measurement apparatus
11 integrating sphere
13 light detector
15, 43 standard light source body holding unit
15a, 43a standard light source body
17, 45 test light source body holding unit
17a, 45a test light source body
19a, 19b, 31a, 31b, 49 light shielding plate
21 control unit
23 manual input means
25, 57 lid body
33, 55 hinge driving unit
35 driving unit
41 moving stage
47 driving unit
51 lighting position
53 removable cover
ax rotation axis parallel to the plane of the drawing
x center line

The invention claimed is:

1. A light measurement apparatus comprising:
an integrating sphere;
a reference calibration light source body holding unit that is arranged on the integrating sphere and to which a reference calibration light source body is attached;
a test light source body holding unit that is arranged on the integrating sphere and to which a test light source body to be measured is attached;
a light detection unit that is arranged on the integrating sphere and detects light from the reference calibration light source body and the test light source body; and
a control unit that controls lighting of the reference calibration light source body and the test light source body,
a first light shielding unit that lies between the reference calibration light source body holding unit and the light detection unit; and
a second light shielding unit that lies between the test light source body holding unit and the light detection unit,
the light measurement apparatus being configured so that only either one of the reference calibration light source body and the test light source body is able to selectively emit light in the integrating sphere,
wherein the first light shielding unit and the second light shielding unit each are retractable and extendable.

2. The light measurement apparatus according to claim 1, wherein the reference calibration light source body holding unit and the test light source body holding unit are arranged symmetrically with respect to a center line of the integrating sphere, the center line passing through a center of a light receiving surface of the light detection unit.

3. A light measurement apparatus comprising:
an integrating sphere;
a reference calibration light source body holding unit that is arranged on the integrating sphere and to which a reference calibration light source body is attached;
a test light source body holding unit that is arranged on the integrating sphere and to which a test light source body to be measured is attached;
a light detection unit that is arranged on the integrating sphere and detects light from the reference calibration light source body and the test light source body;
a control unit that controls lighting of the reference calibration light source body and the test light source body;
a moving stage that carries the reference calibration light source body holding unit and the test light source body holding unit and is arranged on a wall of the integrating sphere; and
a positioning mechanism that makes the moving stage move so that only either one of the reference calibration light source body holding unit and the test light source body holding unit is positioned to a single common lighting position,
the light measurement apparatus being configured so that only either one of the reference calibration light source body and the test light source body is able to selectively emit light in the integrating sphere.

4. The light measurement apparatus according to claim 3, wherein: the moving stage carries the reference calibration light source body holding unit on one surface and the test light source body holding unit on the other, opposite surface, and is rotatable; and the positioning mechanism determines an angular position of the moving stage.

* * * * *